Jan. 1, 1935. R. McWADE, JR 1,986,214
POWER TRANSMISSION CONTROL
Filed Aug. 18, 1930 2 Sheets—Sheet 1

Inventor:
Robert McWade Jr.,
By
Attorney.

Inventor:
Robert McWade Jr.;
By
Attorney.

Patented Jan. 1, 1935

1,986,214

UNITED STATES PATENT OFFICE 1,986,214

POWER TRANSMISSION CONTROL

Robert McWade, Jr., Los Angeles, Calif.

Application August 18, 1930, Serial No. 476,039

10 Claims. (Cl. 74—343)

This invention belongs in the general class of gear changing appliances, and, more specifically, to gear shift systems, having a clutch interposed between the power source and the gears, and particularly for motor vehicle drives.

The objects of this invention are to provide a means whereby the clutch is manipulated and the gears shifted both by a single member or lever, and in which the motion of the lever to co-engage any two gears is always in one direction, as contrasted with the present system of movement in two directions of the gear shift lever, the parts being so adjusted that the first motion of the lever is to open the clutch, its second motion being to shift the gear, and coincidentally re-engage the clutch. And, further, to produce a power and speed control system which is reliable, easy to operate, simple in its movements, and, therefore, operable by persons who have not the natural mechanical aptitude to operate the present-day systems, which require motion in two directions of the gear shift lever for gear changing, and a synchronous foot motion of a second member to control the clutch.

With the foregoing, and other, objects in view, the invention consists in the novel and useful formation, construction, inter-relation and combination of parts, members and features, as well as mode and methods of use thereof, and steps and performances taken and had, all as hereinafter described, shown in the drawings, and finally pointed out in claims.

In the figures, "B" is a middle or neutral stem or spindle adapted to slide longitudinally, being supported in the frame "A". Mounted thereon is a lug, or slotted member, "b". The slot shown therein is adapted to receive the lower end of the shift lever, so that movement of the shift lever will communicate longitudinal motion to slide member "B". This is the neutral position of the gear shift lever, and motion of the lever or of the member "B" does not cause movement of any of the gears. Its only function is to position the lever in a neutral position, and to enable opening or closing of the clutch, which is attached to the lever, without gear change.

Member "B—2" is identical in form and method of support in the frame with "B". Forward motion of "B—2" will mesh one pair of gears, while rearward motion will mesh another and different pair of gears. However, as it is intended that the motion of the gear shifting lever be limited to one direction only the auxiliary member "B—4" is provided. As shown, members "B—2" and "B—4" have racks, "41" and "41", cut along a portion of their respective lengths, and meshing with these racks is the pinion "H—2". Therefore, motion of "B—4" causes a reverse motion of "B—2". Hence, when the end of the shifting lever is moved into the slot of the lug, "b—4", and the member, "B—4", is moved forward, this causes motion of member "B—2" rearward. The same description applies to members "B—1" and "B—3".

It is obvious, therefore, that "B—2" is caused to move forward and produce intermeshing of one pair of gears when the control lever is in slot of "b—4", and it is caused to move backward and produce intermeshing of another pair of gears when the control lever is in slot "b—2" and the member "B—4" is also moved forward.

Figure 2:
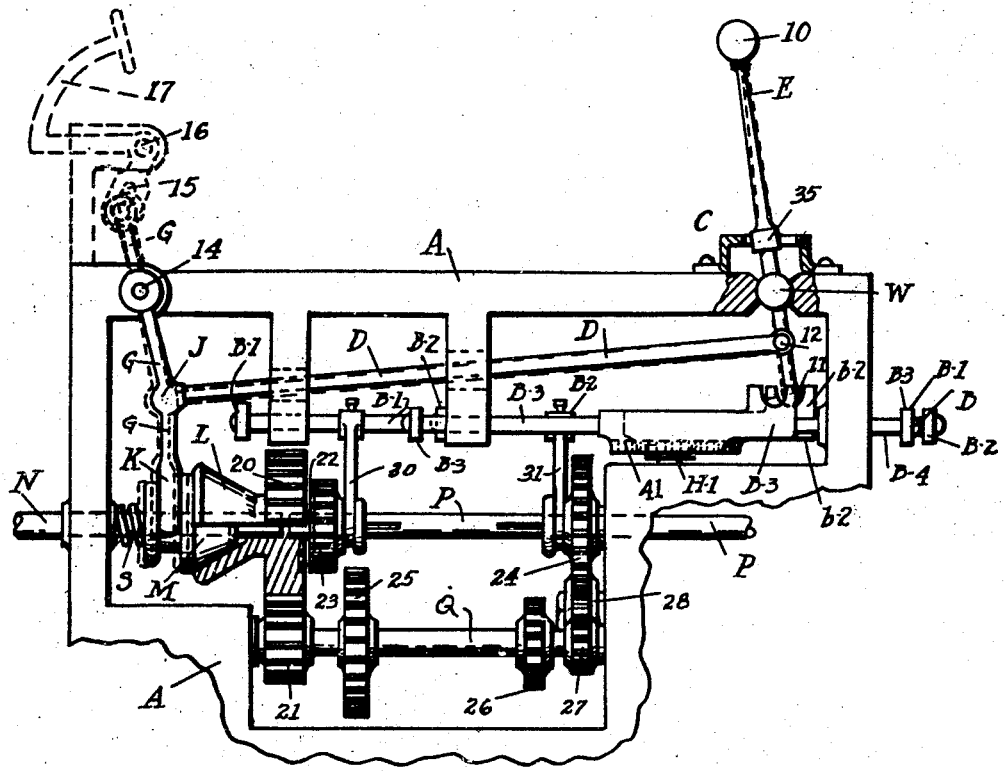
Fig. 2 is a longitudinal elevation, partly in section, showing a clutch and variable transmission gear arrangement, illustrative of one form of this invention, an auxiliary foot control lever for the clutch being indicated in the dotted lines.
Figure 6:
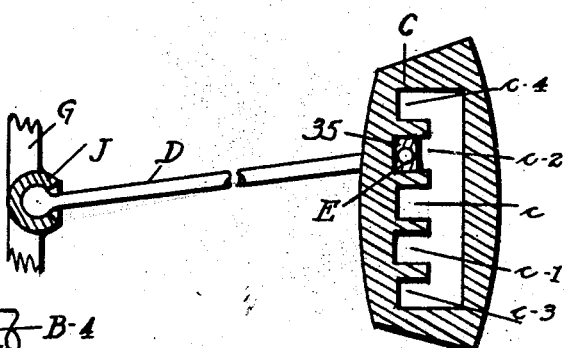
Fig. 6 is a plan view of a guide plate for directing and positioning the control lever.
Figure 3:
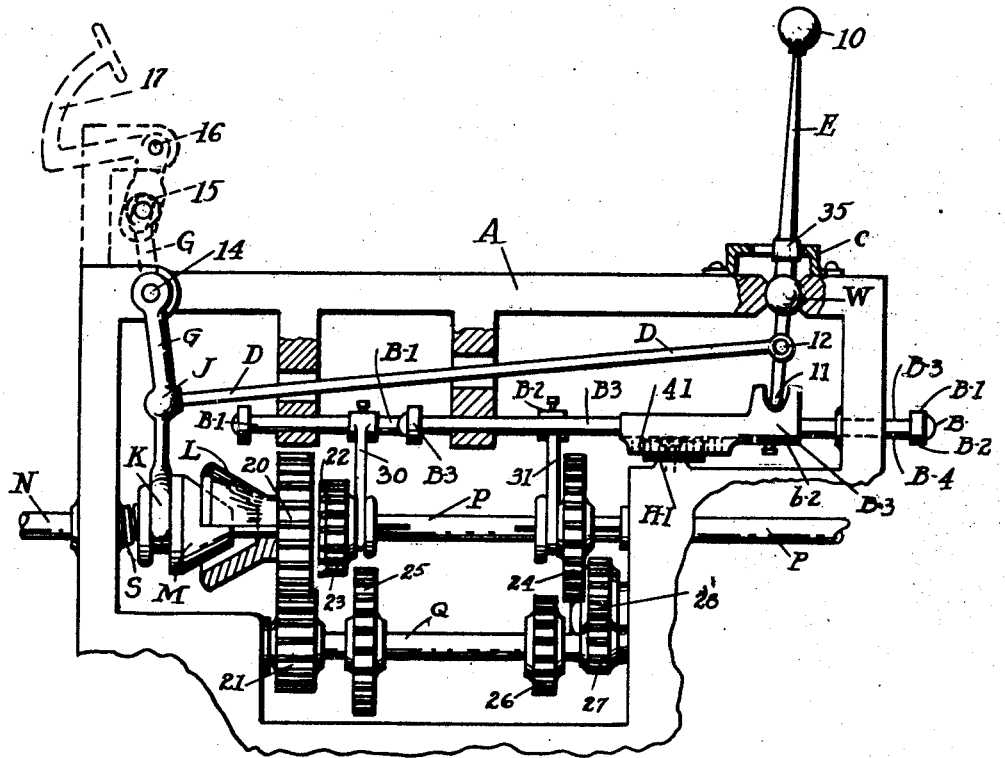
Fig. 3 is a similar view, the relative positions of the parts differing from those shown in Fig. 2.

Referring now to Figs. 2 and 3: Fig. 2 shows gear "24" meshed with gear "28", the clutch, made of an outer cone, "L", and a cooperating inner cone, "M", being in engagement, so that shaft "N" from the power source is enabled to drive gear "20" through clutch "L". This causes turning of the pinion, "21", meshed with gear "20", which latter is keyed to shaft "Q", and this shaft is, therefore, constrained to turn whenever clutch "L" is engaged in the usual, well-known manner. Since gears "25", "26" and "27" are likewise keyed on shaft "Q", these gears all rotate continuously when clutch "L" is engaged. In the position shown in Fig. 2, gear "27" drives gear "28", which in turn drives gear "24", the latter being splined on shaft "P", which latter is the propeller shaft, and transmits power to any desired mechanism, as the drive wheels of a motor car. In order to shift gears, the operating lever "E", which is supported by and turns in ball socket joint "W", is employed. Its lower end, "11", being in lug "b—2", its upper end or ball handle, "10", is drawn toward the right, thereby causing motion of lug "b—2" and gear shift spindle, "B—2", toward the left. This motion causes opening of the clutch "L" through the action of the connecting link "D", which is pivotally connected to the lower end of lever "E" at "12", and is connected with clutch cone-moving yoke "K" at "J", which latter is a jointed connection having movement in two or more directions, preferably a ball joint, as shown in Fig. 6. The clutch cone-moving yoke "K" is extended upward to a pivotal point "14", this extension forming a lever "G" having a fulcrum at its upper end and the yoke "K" for the cone "M" at its opposite end. Obviously, movement of the lower end of lever "E" to the left will push cone "M" outward from surrounding cone "L", thereby opening the clutch. This condition is depicted in Fig. 3, which shows the ball handle "10" of lever "E" moved toward the right, the clutch open and the lower end "11" of lever "E" in a position to slide transversely into a lug on the next adjacent gear-moving spindle. The control lever "E", therefore, has the customary motion in two direction; that is, transverse motion, whereby the lower end of the lever is shifted from one slot to another in the gear-shift spindle lugs, and the longitudinal motion whereby the gear-shift spindles are moved longitudinally, forward or backward.

In Fig. 3, the ball handle "10" having been moved to the right a sufficient distance to open the clutch and to bring the slot in lug "b—2" in line with the slots of the other lugs, the ball handle "10" may now be moved in a transverse direction, thereby transferring lower end "11" of lever "E" from lug "b—2" to the lug of some other spindle. If it be desired to cause gear "24" to engage with gear "26", lug "b—2" and spindle "B—2" must be moved toward the left, so that yoke "31" will cause leftward motion of gear "24" along splined shaft "P". Since gear shifting is accomplished by manual motion in one direction only, the lever will be given a transverse motion, bringing the lower end "11" into next adjacent lug "b—4". Pushing the ball handle "10" of lever "E" leftward will move spindle "B—4" toward the right, and this motion, transmitted through gear "H—2", will move spindle "B—2" toward the left, causing the desired meshing of gears "24" and "26".

The similarity of motion, in moving gear "23" either toward the right to mesh with gear "25" or toward the left to clutch with the main gear "20" at "22" so that the drive becomes direct, or what is termed "in high gear", to the previously described operation, is obvious.

In the movement of the lever "E" transversely and longitudinally, its positioning is made definite and its path in any of the possible directions of motion fixed by the plate, "C", formed as shown in Fig. 6. The member "C" is mounted on the gear box above the ball fulcrum "W" of control lever "E", as shown in Figs. 2 and 3. The lever passes through the opening in the plate, and is provided with an appropriately shaped block "35" fastened around the lever "E", and which has a configuration to fit in the arc and the radial slots which form the guide slots through the plate "C". Obviously, the directions and limits of motion of the lever "E" are fixed by the form and extent of the perforation through plate "C". Of course, the lever "E" may be appropriately shaped to fit in the perforated arc and slots instead of attaching a block to the lever, if the former construction be preferred.

If the ball handle "10" be pushed to the left as far as the perforation in the plate permits, the lower end "11" of the lever will have moved the gears into mesh and the clutch members "L" and "M" are engaged. When it is desired to bring the lower end of the lever toward the left by moving ball handle "10" toward the right, it is caused to follow the proper path by the slots "c", "c—1", "c—2", "c—3" and "c—4" respectively, and the motion toward the right is limited by the edges of the slots. An appropriate cooperating guide member "35" is fastened on the lever "E", as indicated, or the lever may be appropriately formed to cooperate with the guide plate perforation "c".

Figures 4, 5:
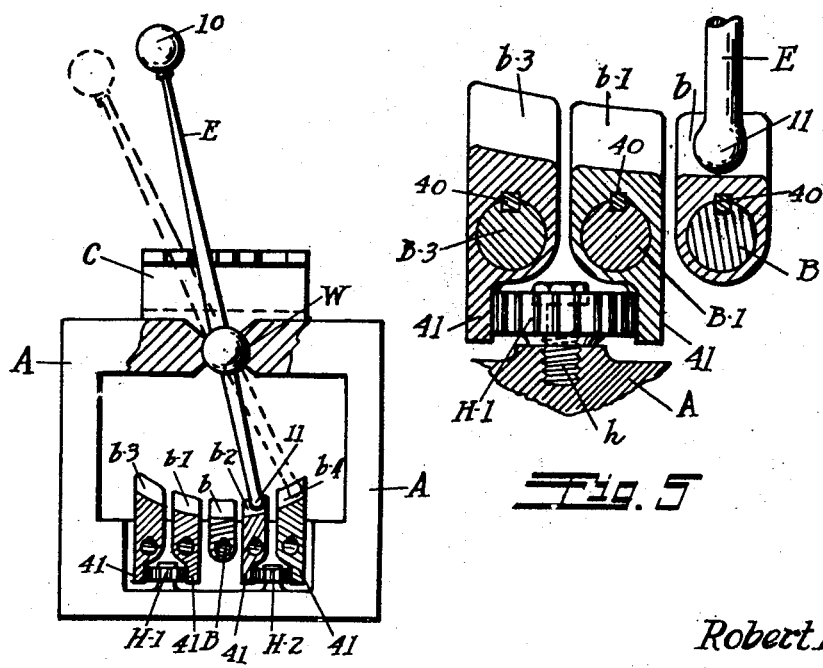
Fig. 4 is an end view, partly in section, of the gear shift lever, shifting spindles and lugs which cooperate with the lever.
Fig. 5 is a fragmentary portion of Fig. 4 shown to a larger scale.

In Figs. 4 and 5, one preferred construction is indicated. The gear shift spindles, as "B—1" and "B—3", which are to move reverse to each other, have racks "41" formed by lower longitudinal extensions, into which appropriate teeth are cut and the pinion, as "H—1", connecting them and turning about a bolt, as "h", is mounted on an appropriate part of the frame "A".

From the description, it is obvious that the clutch may be operated independently when the control lever "E" is in neutral position, and without need of any pedal or foot-moved member. However, if it be desired by persons who are accustomed to using the pedal clutch control, such an attachment may be provided, as shown in the dotted lines in Figs. 2 and 3, "17" being the pedal lever pivoted at "16", and having a slot "15" in an extension of "17" below pivot "16". This requires that the clutch control lever "G" be extended upward beyond its pivot point "14", and provided with a pivot to mate with slot "15" in the lower extension of the pedal lever "17". The dotted lines show this construction clearly, and it is obvious that pressing the pedal lever toward the left, which would be forward if the installation were in a motor car, the clutch will be released. Also, the lever "E" will be similarly moved, the lower end thereof moving toward the left. This, however, would make no difference in the operation of the system or in the driving of a motor car, because when the pedal lever "17" is released and the clutch is re-engaged by pressure of spring "S", acting to push cone "M" into surrounding cone "L", the same gears which were in engagement before moving the foot pedal are restored to engagement by its release.

It is understood that the preceding description and accompanying drawings are illustrative only of the general principles of this invention and one form which it may take. In causing members "B—1" and "B—2" to move in a direction opposite to that of the control lever "E", several kinds of mechanical appliances and principles may be used; the reversing pinions "H—1" and "H—2" shown constitute one simple easily-understood arrangement.

The distance of motion of a control lever "E" is usually fixed by the width of the gear faces and the clearance between adjacent gears, while the movement of the clutch yoke depends on the type and specific characteristics of the clutch selected, so that these two operations may require widely different distances of motion of the control lever "E". If the distance of movement of the control lever be fixed by the gear change requirements, the distance of motion necessary for the clutch yoke can be easily adjusted to the range of motion of the lever "E" by selecting proper relative lever arms for the joint "12", the distance between pivot "14" and joint "J" and between joint "J" and the centre of yoke "K".

Figure 7:
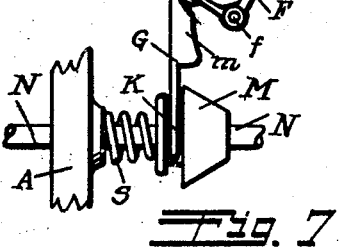
Fig. 7 is a modification of part of Figs. 2 and 3.

Other clutch control means may be adopted, such as indicated in Fig. 7. By this mechanism, the clutch may be opened in the first part of the movement of the lever "E", and the lever then continue moving without further axial movement of the clutch member "M", and production of correspondingly excessive compression of spring "S".

Yoke "K" is attached to one end of lever "G", which is pivoted at the other end at "14". Bellcrank "F", pivoted at "f", has one end jointed with link "D" from lever "E", at "d". The other end of the bell-crank "F" is rounded, or may have a friction roller, as "J", mounted thereon. This end of the bell-crank presses against the cam surface "m". Obviously, motion of "D" toward the left will turn the end "J", of bellcrank "F" downwards about pivot "f", thereby impelling lever "G" and yoke "K" to the left. When these parts have moved sufficiently to release the clutch against the pressure of spring "S", the end "J" has reached the limit of the inclined cam surface "m". Further movement of link "D" and bell-crank "F" will not move lever "G" and yoke "K" any further, the cam surface "m" being shaped to permit end "J" to ride against it without further leftward movement.

It is to be noted that in the preceding illustrative example of my invention the gear shift yokes 30 and 31 are shown and described as being mounted on shift stems B—1 and B—2 respectively. It, however, is obvious that the gear shift members may be mounted on any of the shift stems, those being always selected which are most convenient for successive gear-shifts.

For example, in automobile practice, it is customary and convenient to move the gears to mesh in the following order, viz: high, intermediate, low and reverse. Such an arrangement would require that the gear shift yoke 30 be mounted on shift stem B—1 while yoke 31 would be mounted on shift stem B—4. But my invention is not limited to any specific order of operation or of gear yoke connections, nor to any number of shifting stems or of gear shift yokes, it being possible and at times desirable to provide a shift gear and yoke for each shifting stem.

Figure 1:
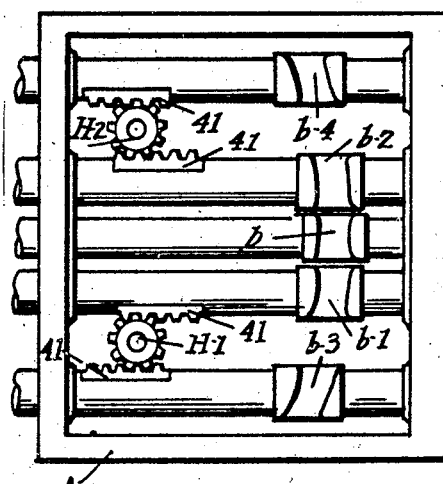
Fig. 1 is a fragmentary plan view of a theoretical mechanism to illustrate a principle of this system.

In order to shorten the claims, it is considered advisable to add the following definitions: The word "neutral" as used herein is intended to have the same meaning as it has colloquially, to wit, that position of the gears in the gear transmission, of the gear slides and of the gear-shift lever, at which all gears are disengaged, and from which position a gear and the parts connected thereto must be moved to cause engagement of any of the gears. This neutral position corresponds with the midpoint of the movement of the shifting lever in the present usual form of two-way movement gear shifts. The term "gear-shift" is meant to accord with the usual and standard meaning, viz., a pair of parallel shafts on one whereof is fixedly mounted a plurality of gears of different diameters, said gears being spaced axially on the shaft, while movable gears are mounted on the other shaft, which latter gears are splined or otherwise constrained to rotate with the shafts but free to slide axially on the shaft, each sliding gear being fitted to mate with a gear fixed on the first-named shaft. By sliding different gears on the second shaft to engage with the first-named fixed gears, in the well-known manner of substantially all present-day gear shifts, the gear ratio between the two shafts is changed. The terms "gear shift member" or "shift lever" are synonymous and either refers to a manually moved lever or the like which is mounted for a comparatively slight movement transverse of the gear slides or shafts for selection of a gear to be moved on the splined shaft and also for a greater movement parallel to the gear slides, which latter movement moves that gear selected by the first, or transverse motion of the lever, into mesh with one of the fixed gears. By "gear slide" is meant a bar, as B—1 or B—3 (Fig. 1) slidably mounted longitudinal of the gear shafts and mechanically connected with a slidable gear as before described. Gear slides are provided with recesses or projections or otherwise so formed at an appropriate point or zone along their length— usually adjacent one end—as to engage with the previously described "gear shift lever" or "member", as later described. One illustration of this arrangement is shown in Figs. 1 and 4 in which the lower end 11 of manual control and selective lever E is formed and fitted to move transversely across the recessed ends of slide members b, b—1, etc., when in neutral position and come to rest when engaged with any one of the levers as b—3 or b—4, and after such selective engagement, the lever is then moved to cause engagement of the selected gear with its mating gear. For convenience, the slide recesses are arranged in suitable alignment, preferably curved to receive lever end, 11, as shown. The lever E is shown as ball-mounted at W; hence it can move in any direction unless restrained. Although the lever E requires movement in only two directions to fulfil operating needs, the universal form shown is a standard device usually obtainable at a low cost and satisfactory for the purpose. It is to be observed that member B is not a gear slide but merely a member to provide recess b for the lower end 11 of lever E when the lever is in neutral. Movable slides B—1 and B—2 could be set adjacent each other and the ball end 11 rest partly in both recesses, b—1 and b—2, when lever E is in neutral. But, in any case, B—1, B—2, B—3 and B—4 are the only gear-shifting slides shown in the drawings.

Having described my invention in connection with illustrative embodiments, forms, proportions, and arrangement of parts, it will be understood that many variants thereof are possible to those skilled in the art, and my invention, in its broader aspects, is not limited to the specific construction herein described and shown, as changes in the sizes, proportions, configurations, arrangements, assemblage, interaction, juxtaposition and mechanical relations, as well as additions, omissions, substitutions, combinations and alterations of forms, parts, members and features, may be made without departing from the broad spirit of this invention.

I claim as my invention:

1. In a manually operated selective gear-shift transmission, the combination of: a plurality of sliding gears; a plurality of gear-moving slides; a unitary manual control member mounted to move in a direction substantially transverse of said slides and also in a direction parallel thereto; means on said slides and on said manual member for co-engagement of said member with any one of said slides, by said transverse movement of said member to cooperating position with the slide to be moved; and means to prevent movement of said control member except in one direction only.

2. In a selective manually operated gear-shift for a power transmission, the combination of: gear-moving slides; a manual selective and operating member mounted for movements both transverse and parallel to said slides; co-engaging means on said member and on each of said slides whereby any one of said slides and said member may be mechanically connected or disconnected; and means obstructing movement of said operating member from neutral in any direction except one.

3. In a selective gear-shift for a power transmission of the character described, the combination of: a single manual control member; a plurality of slidable gears; a plurality of gear slides for shifting the gears; connections between each gear and a slide; co-engaging means on said control member and on each of said gear slides, said control member being movably supported for transverse selective motion when said parts are in neutral, and for longitudinal motion from means to prevent motion from neutral in any direction except one.

4. In a manually-operated selective gear-shift for a power transmission in which all gear-meshing movements are in one direction only, the combination of: a single manual control member; a plurality of slidable gears; a plurality of gear slides for shifting the gears; connections between each gear and a slide; co-engaging means on said control member and on each of said gear slides, said control member being movably supported for transverse selective motion when said parts are in neutral, and for longitudinal motion from neutral and means to prevent movement of said control member from any part of its neutral path except in one direction.

5. In a selective gear-shifting mechanism for a variable-speed transmission having a plurality of slidable speed-change gears, the combination of: a plurality of parallel slides for shifting said gears; a single manual control member for shifting said slides; co-engaging means on said control member and on each of said slides disposed to align in neutral position, said control member being mounted to be selectively moved transversely in neutral to engage any one of said slides and for subsequent longitudinal movement to shift the selected slide; and means for limiting the movements of said control member, whereby all of the longitudinal speed-changing movements thereof from neutral will be in one direction only and whereby all of the movements thereof back to neutral will be in a reverse direction.

6. In a selective gear-shifting mechanism for a variable-speed transmission having a plurality of slidable speed-change gears, the combination of: a pair of parallel slides for each of said gears, interconnected for simultaneous movement in opposite directions; a single manual control member for shifting said slides; co-engaging means on said control member and on each of said slides disposed to align in neutral position, said control member being mounted to be selectively moved transversely in neutral to engage any one of said slides and for subsequent longitudinal movement to shift the selected slide; and means for limiting the movements of said control member, whereby all of the longitudinal speed-changing movements thereof from neutral will be in one direction only and whereby all of the movements thereof back to neutral will be in a reverse direction.

7. Means for single directional shifting of gears in a gear power transmission, including shiftable gears, slides for said gears, a single control member mounted for motion along a neutral path and for motion in direction of movement of said slides and cooperating engaging means on said control member, and means limiting movement of said control member to one direction only, from the neutral path.

8. In a one-directional, unitary control, gear-meshing device, the combination of a gear-changing power transmission having shiftable gears, slides for moving the gears, a single control member mounted to move along neutral and along slide-moving paths, engaging means on each slide, and co-engaging means on the control member, and means limiting the movement of said control member in one direction only along a slide-moving path and from the neutral path.

9. The combination of: a plurality of gear slides for a power transmitting gear shift, a single control member therefor mounted for movement in a plurality of directions, unitary engaging means on each gear slide to lock with said control member, cooperating locking means therefor on the control member, and means limiting movement of said control member and any coengaged gear slide to one direction only from neutral.

10. In a power transmission gear shift, the combination of: slide members for shifting the gears thereof, having a neutral position in which all gears are disengaged, a single control member mounted for back and forth motion in two paths whereof one is substantially transverse to said slide members, the second directed to move said slide members, coengaging means on each member and on said control member for unitary engagement, and means to suppress motion of said control member and a coengaged slide member from neutral in any direction except one.

ROBERT McWADE, Jr.